(12) United States Patent  (10) Patent No.: US 9,470,537 B2
Raghu et al.  (45) Date of Patent: Oct. 18, 2016

(54) ACCURATE POSITION DETERMINATION NEAR EXIT LANES

(71) Applicants: VOLKSWAGEN AG, Wolfsburg (DE); AUDI AG, Ingolstadt (DE)

(72) Inventors: Kaushik Raghu, Redwood City, CA (US); Premkumar Natarajan, Belmont, CA (US); Lorenz Laubinger, San Francisco, CA (US)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 0 days.

(21) Appl. No.: 14/520,804

(22) Filed: Oct. 22, 2014

(65) Prior Publication Data

US 2016/0116294 A1    Apr. 28, 2016

(51) Int. Cl.
*G01C 21/34* (2006.01)
*G01C 21/30* (2006.01)

(52) U.S. Cl.
CPC ............... *G01C 21/34* (2013.01); *G01C 21/30* (2013.01)

(58) Field of Classification Search
CPC ...................................................... G01C 21/34
USPC ........................................................... 701/23
See application file for complete search history.

(56) References Cited

U.S. PATENT DOCUMENTS

| 4,970,653 A | 11/1990 | Kenue |
| 2013/0049988 A1 | 2/2013 | Roeber et al. |
| 2013/0101174 A1 | 4/2013 | Meis et al. |
| 2013/0208945 A1* | 8/2013 | Nunn ................. G06K 9/00798 382/103 |
| 2014/0156134 A1* | 6/2014 | Cullinane ............. B60W 30/00 701/23 |
| 2014/0156182 A1* | 6/2014 | Nemec ................... G05D 1/021 701/430 |
| 2015/0253142 A1* | 9/2015 | Kornhauser ........... G01C 21/34 701/522 |

FOREIGN PATENT DOCUMENTS

DE  102004060432 A1  8/2006
JP  2008-139104  *  6/2008

* cited by examiner

*Primary Examiner* — Anne Antonucci
(74) *Attorney, Agent, or Firm* — Barnes & Thornburg LLP

(57) ABSTRACT

An in-vehicle system for determining whether a vehicle has moved off of a main roadway and into an exit lane. A navigation unit determines that an exit is approaching on a first side of the vehicle, and a camera obtains image data regarding lane markings and exit signs in response to a notification that the exit is approaching. An image processor identifies predetermined patterns among the lane markings, including V-shaped patterns or Y-shaped patterns. The system determines that the vehicle has moved into the exit lane in response to an identification of one of the predetermined patterns on a second side of the vehicle opposite the first side of the vehicle. The system may verify its determination based on recognition of an exit sign on the second side of the vehicle.

19 Claims, 8 Drawing Sheets

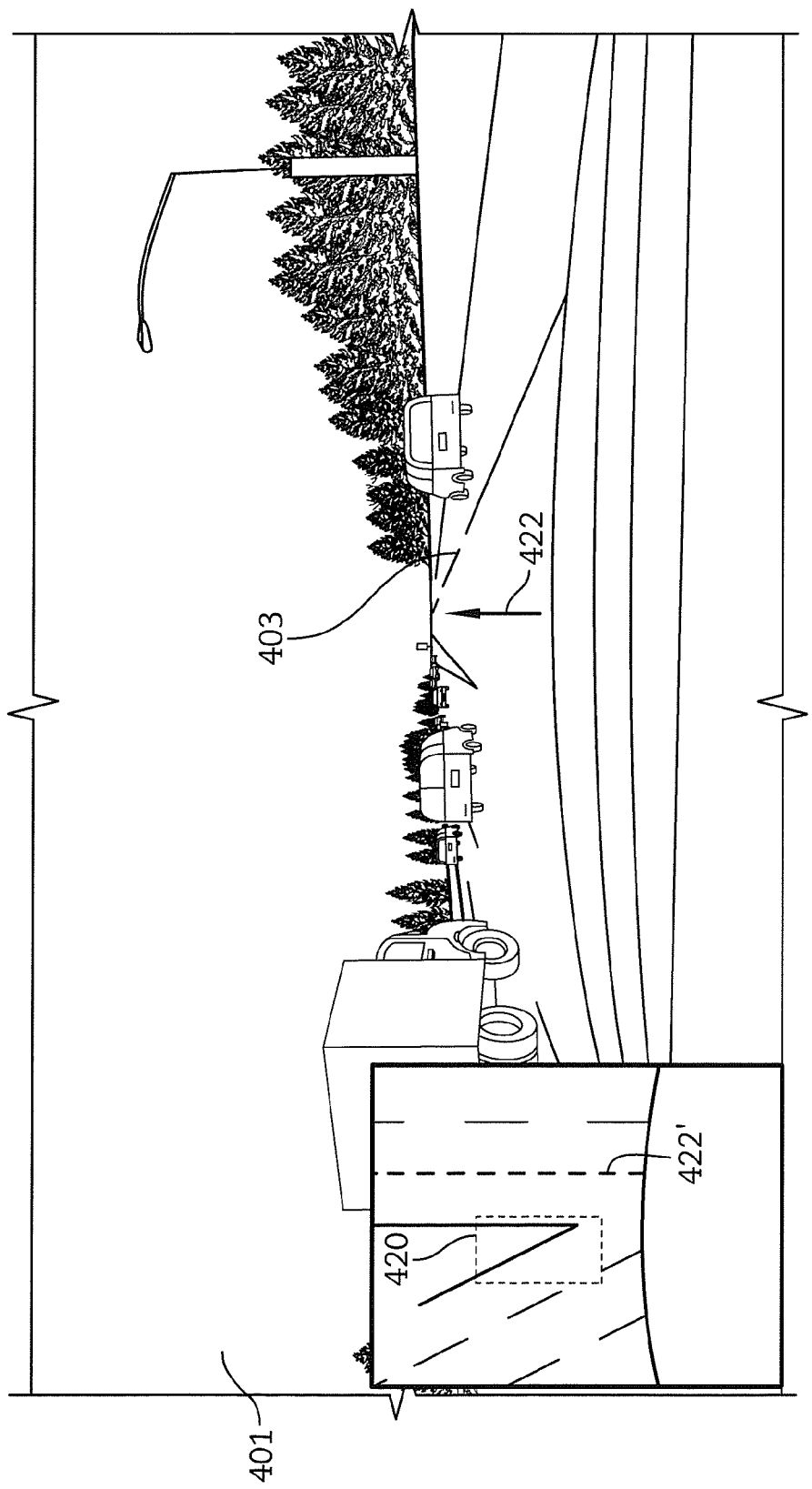

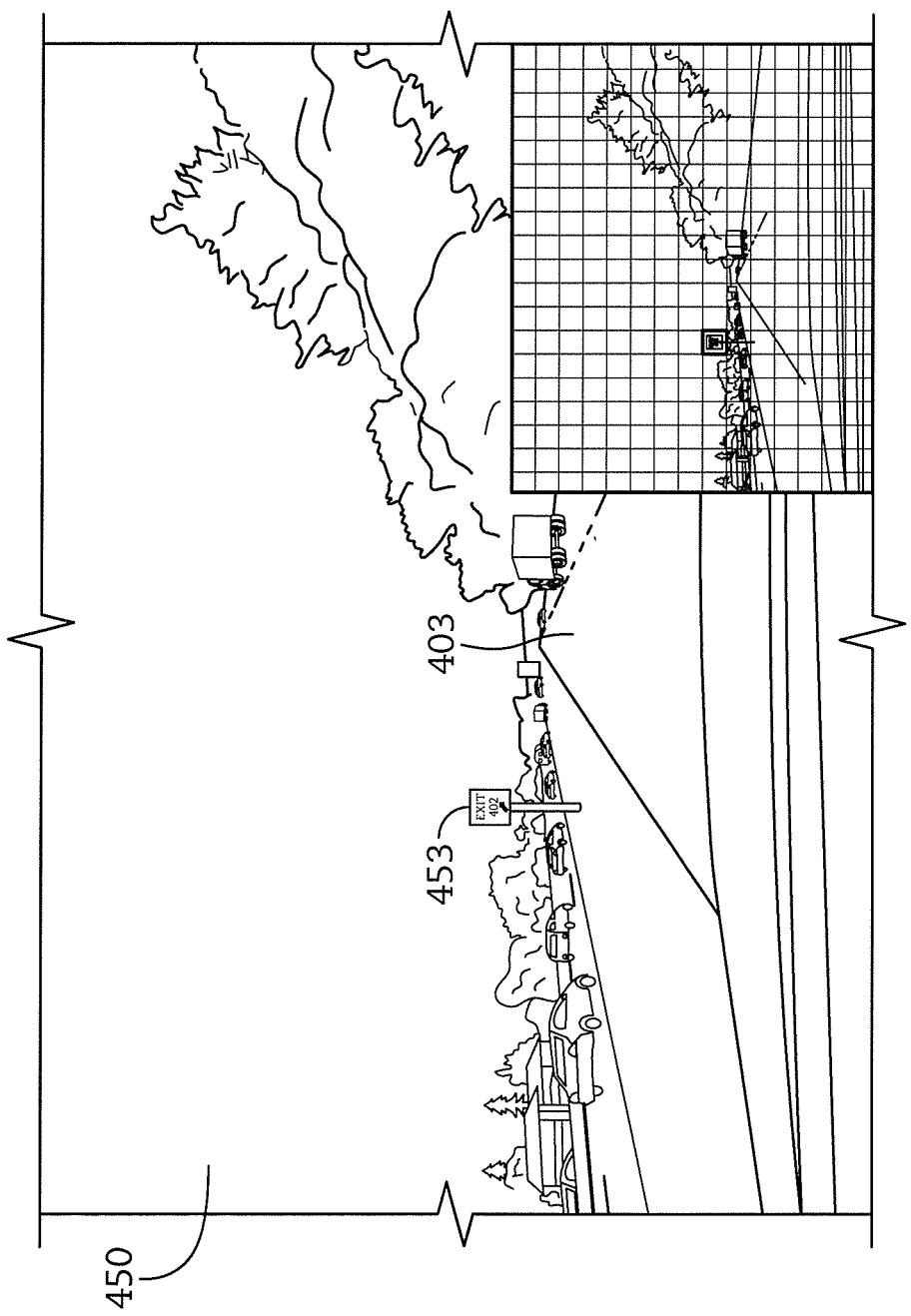

ACCURATE POSITION DETERMINATION NEAR EXIT LANES

BACKGROUND

The present disclosure relates to systems, components, and methodologies for determining a position of a vehicle. In particular, the present disclosure relates to systems, components, and methodologies that improve determinations of a position of a vehicle on a roadway having exit lanes.

SUMMARY

According to the present disclosure, systems, components, and methodologies are provided for determining a position of a vehicle on a roadway having exit lanes.

In illustrative embodiments, an in-vehicle position resolution system uses lane markings to determine whether a vehicle driving on a roadway has continued driving on a main portion of the roadway or has exited onto an exit lane diverging from the main roadway. A navigation system informs the position resolution system that an exit is approaching, and the position resolution system begins detecting lane markings on the roadway. The position resolution system searches for and identifies predetermined patterns among the lane markings, including V-shaped or Y-shaped lane markings, as will be described in more detail below. The position resolution system determines whether the vehicle has continued driving on a main portion of the roadway or has exited onto an exit lane based on where the detected V-shaped or Y-shaped lane markings are positioned relative to the vehicle.

In other illustrative embodiments, an in-vehicle position resolution system uses exit signs to determine whether a vehicle driving on a roadway has exited onto an exit lane. Such determinations may similarly be made based on where detected exit signs are positioned relative to the vehicle.

In certain embodiments, detection of exit signs may be an alternative methodology to resolve the position of the vehicle as compared to detection of lane markings, but detection of exit signs may also be used as a verification of the accuracy of a determination formed in response to detection of lane markings.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which:

FIG. 4A shows exemplary image data captured by a position resolution system in accordance with the present disclosure, and suggests that the position resolution system has detected a predetermined pattern in the form of a V-shaped lane marking to the left of the vehicle;

FIG. 4B shows exemplary image data captured by a position resolution system in accordance with the present disclosure, and suggests that the position resolution system has detected an exit sign to the left of the vehicle;

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Figure 1:
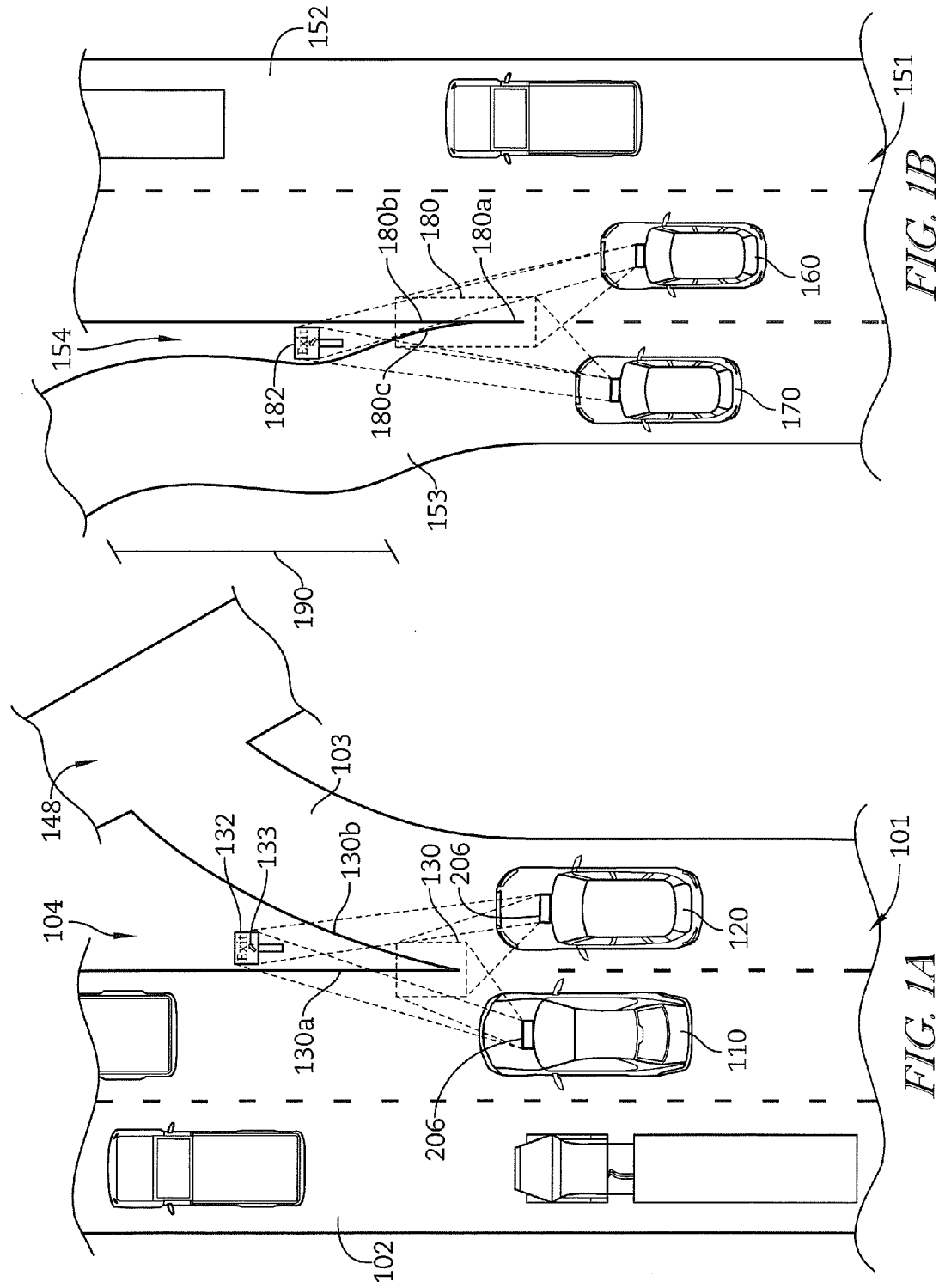
FIG. 1A shows vehicles equipped with a position resolution system in accordance with the present disclosure driving on a roadway, and suggests that the position resolution systems are identifying a V-shaped lane marking and an exit sign to determine whether a vehicle has stayed on a main portion of the roadway or exited onto an exit lane diverging to the right.
FIG. 1B shows vehicles equipped with a position resolution system in accordance with the present disclosure driving on a roadway, and suggests that the position resolution systems are identifying a Y-shaped lane marking and an exit sign to determine whether a vehicle has stayed on a main portion of the roadway or exited onto an exit lane diverging to the left.

An overview of systems, components, and methodologies in accordance with the present disclosure will be provided with reference to FIG. 1A and FIG. 1B. FIG. 1A shows a first vehicle 110 and a second vehicle 120 driving on a roadway 101. The roadway 101 includes a main portion 102 and an exit lane 103 associated with an exit 104. The first vehicle 110 is following a trajectory by which it will stay on the main portion 102 of the roadway 101, while the second vehicle 120 is following a trajectory by which it will exit onto the exit lane 103.

The first vehicle 110 and the second vehicle 120 each include a position resolution system 200 that will be described in further detail in connection with FIG. 2. The position resolution systems 200 include detectors 206, such as cameras, that obtain image data of their respective fields of view. In particular, the detectors 206 may capture image data that include lane markings on the roadway 101 in front of and peripheral to the vehicle 110, as well as road signage in front of and peripheral to the vehicle 110.

The position resolution systems 200 determine whether the vehicles 110, 120 have stayed on the main portion 102 of the roadway 101, or have exited onto the exit lane 103. In particular, the position resolution systems 200 may receive an indication from an in-vehicle navigation system that the exit 104 is approaching on the right-hand side of the roadway 101. The position resolution systems 200 may begin detecting lane markings to identify pre-determined patterns characteristic of exit lanes.

Examples of such pre-determined patterns will be discussed further below. However, in FIG. 1A, the position resolution system 200 has identified a predetermined pattern of lane markings 130 consisting of a first solid lined lane marking 130*a* and a second, divergent solid lined lane marking 130*b*. Such patterns may generally be referred to as "V-shaped lane markings," owing to the generally V-shaped configuration of the first and second solid lined lane markings 130*a*, 130*b*. V-shaped lane markings typically occur when an exit lane is diverging from a main portion of a roadway.

The position resolution systems 200 determines which side (left or right) the predetermined pattern of lane markings 130 are relative to the vehicles 110, 120. In the case of the vehicle 110, the position resolution system 200 determines that the predetermined pattern of lane markings 130 is on a right side of the vehicle 110. In the case of the vehicle 120, the position resolution system 200 determines that the predetermined pattern of lane markings 130 is on a left side of the vehicle 120.

The position resolution systems 200 then determine whether the vehicles 110, 120 have stayed on the main portion 102 of the roadway 101, or have exited onto the exit lane 103. The determination can be formed based on a combination of information regarding the side of the roadway 101 on which the exit 104 exists, along with information regarding the side of the vehicles 110, 120 on which the predetermined pattern of lane markings 130 exist. In the case of the vehicle 110, the position resolution system 200 may factor that the exit 104 is on the right side of the roadway 101 and that the predetermined pattern of lane markings 130 is on the right side of the vehicle 110, and conclude that the vehicle 110 has remained on the main portion 102 of the roadway 101. In contrast, in the case of the vehicle 120, the position resolution system 200 factors that the exit 104 is on the right side of the roadway 101 and that the predetermined pattern of lane markings 130 is on the left side of the vehicle 120, and concludes that the vehicle 120 has exited onto the exit lane 103.

In addition to using the predetermined pattern of lane markings 130, or as an alternative to using the predetermined pattern of lane markings 130, the position resolution systems 200 may use the exit sign 132 to determine whether the vehicles 110, 120 have exited onto the exit lane 103. In particular, the detectors 206 may obtain image data that captures road signage within their respective fields of view. The position resolution systems 200 may recognize exit signs within their respective fields of view using image recognition techniques to be discussed in more detail below. Depending on the resolution of the detectors 206 and the positioning of the exit sign 132, this recognition may occur before, at around the same time as, or after the position resolution systems 200 identify the predetermined pattern of lane markings 130.

In response to recognizing the exit sign 132, the position resolution systems 200 may determine whether the vehicles 110, 120 have exited onto the exit lane 103. The determination can be formed by factoring the side of the roadway 101 on which the exit 104 exists, and the side of the vehicles 110, 120 on which the exit sign 132 was detected. In the case of the vehicle 110, the position resolution system 200 factors that the exit 104 is on the right side of the roadway 101 and that the exit sign 132 is on the right side of the vehicle 110, and concludes that the vehicle 110 has remained on the main portion 102 of the roadway 101. In the case of the vehicle 120, the position resolution system 200 factors that the exit 104 is on the right side of the roadway 101 and that the exit sign 132 is on the left side of the vehicle 120, and concludes that the vehicle 120 has remained on the main portion 102 of the roadway 101.

In certain embodiments, the use of both lane markings and exit signs can provide a two-step verification process. In typical highway topologies, predetermined patterns of lane markings characteristic of exit lanes appear on a roadway ahead of an exit sign, as depicted in FIG. 1A. As such, the position resolution system 200 may have an earlier opportunity to resolve the position of the vehicles 110, 120 based on predetermined patterns of lane markings, and then may use exit signs for confirmation. However, there may also be situations in which exit signs are detected first, with predetermined patterns of lane markings used for confirmation.

Continuing with the overview, FIG. 1B shows a roadway 151 having a main portion 152 and an exit lane 153 associated with an exit 154. Two vehicles 160, 170 equipped with position resolution systems 200 are driving on the roadway 151. Here, the roadway 151 includes a predetermined lane marking 180 that consists of a single solid lined lane marking 180*a* that branches into two divergent solid lines 180*b*, 180*c*. Such a pattern may generally be referred to as a "Y-shaped lane marking," owing to the generally Y-shaped configuration of the solid lined lane markings 180*a*, 180*b*, and 180*c*. As with V-shaped lane markings, Y-shaped lane markings typically occur when an exit lane is diverging from a main portion of a roadway.

FIG. 1B illustrates how the position resolution systems 200 factor the side of the roadway 151 on which the exit 154 exists. In the case of the vehicle 160, the position resolution system 200 factors that the exit 154 is on the left side of the roadway 151 and that the predetermined pattern of lane markings 180 is on the left side of the vehicle 160. In response, the position resolution system 200 may determine that the vehicle 160 has stayed on the main portion 152 of the roadway 151. In the case of the vehicle 170, the position resolution system 200 considers that the exit 154 is on the left side of the roadway and that the predetermined pattern of lane markings 180 is on the right side of the vehicle 170. In response, the position resolution system 200 may determine that the vehicle 170 has exited onto the exit lane 153.

As with the illustrative us shown in FIG. 1A, the position resolution systems 200 depicted in FIG. 1B may also use an exit sign 182 as an additional or alternative mechanism for determining or confirming whether the vehicles 160, 170 have exited onto the exit lane 153. The position resolution systems 200 will factor that the ramp 154 exists on the left side of the roadway 151 when making such determination or confirmation.

As summarized above, position resolution systems in accordance with the present disclosure provide a technical solution to the problem of providing precise and timely indications of whether a vehicle has stayed on a main portion of a roadway or merged onto an exit lane. Such precise and timely indications are beneficial for several reasons.

In one respect, the position resolution system 200 may provide more accurate and timely detections of when vehicles merge onto exit lanes than other technologies, such as in-vehicle navigation systems. Using the vehicle 120 of FIG. 1A as an example, the vehicle 120 is merging onto the exit lane 103 but is still closely located to the main portion 102 of the roadway 101. The native technology of the in-vehicle navigation system (e.g., GPS) may not have sufficient spatial resolution to determine that the vehicle 120 has left the main portion 102 of the roadway 101 and merged onto the exit lane 103. Such determinations may require the ability to resolve vehicle positions and roadway features to distances of feet or even inches. This problem is exacerbated where, as in the example of FIG. 1B, the exit lane 153 proceeds closely to and in parallel with the main portion 152 of the roadway 151 for a length 190. As the vehicle 170 proceeds along the length 190, the in-vehicle navigation system may be unable to resolve that the vehicle 170 has taken the exit 154.

The inability of an in-vehicle navigation system to resolve that a vehicle has taken an exit can cause problems. For example, the vehicle 120, upon exiting onto the exit lane 103, may promptly be faced with a decision on which direction to turn at an intersection 148. The in-vehicle navigation system may have failed to resolve that the vehicle 120 merged onto the exit lane 103 in sufficient time to provide the vehicle 120 with route guidance regarding which direction to turn at the intersection 148, causing uncertainty and frustration to the driver.

The position resolution system 200 in accordance with the present disclosure, in contrast, may provide accurate and timely detections of when a vehicle has merged onto an exit lane. The position resolution system 200 may communicate its detections to an in-vehicle navigation system, so that the in-vehicle navigation system has more accurate information regarding the position of the vehicle and can provide timely route guidance.

In another respect, the position resolution system 200 may improve safety by allowing the vehicle to timely disengage an autonomous driving mode in response to a vehicle merging onto an exit lane. A vehicle may have an autonomous driving function that is safe when used on a main portion of a roadway, but unsafe when used on an exit lane. As an example, an autonomous driving mode may be safe when a vehicle is in a slow-moving traffic jam on a main portion of a roadway. In such slow-moving and predictable conditions, autonomous driving may be safe. The vehicle, however, may move (e.g., unintentionally) into a portion of the roadway that leads to an exit lane. When on the exit lane, continuing to operate the vehicle in the autonomous driving mode may be dangerous, due to the relatively sharp turn of the exit lane 103 along with other unpredictabilities of off-highway driving.

Thus, it may be beneficial for the vehicle to recognize that it has merged onto the exit lane so it can issue a warning to the driver, disengage the autonomous driving mode, and safely return control of the vehicle to the driver. The position resolution system 200, by providing an accurate and timely detection, can cause the autonomous driving system to safely disengage.

In still another respect, the position resolution system 200 may provide enhanced performance for autonomous driving systems in general. The autonomous driving system may be programmed with different profiles suitable for different respective driving conditions, including highway profiles, exit lane profiles, and others. By providing accurate and timely detection that the vehicle has merged onto an exit lane, the position resolution system 200 enables the vehicle to more quickly switch to a driving profile suitable for use on an exit lane. Likewise, for vehicles that remain on a main portion of a roadway, the autonomous driving system of the vehicle may perform better with accurate and timely detection of exit lanes in a proximity of the vehicle. Such information can be used to better predict on-road events, such as whether neighboring vehicles are likely to exit the roadway.

Figure 2:
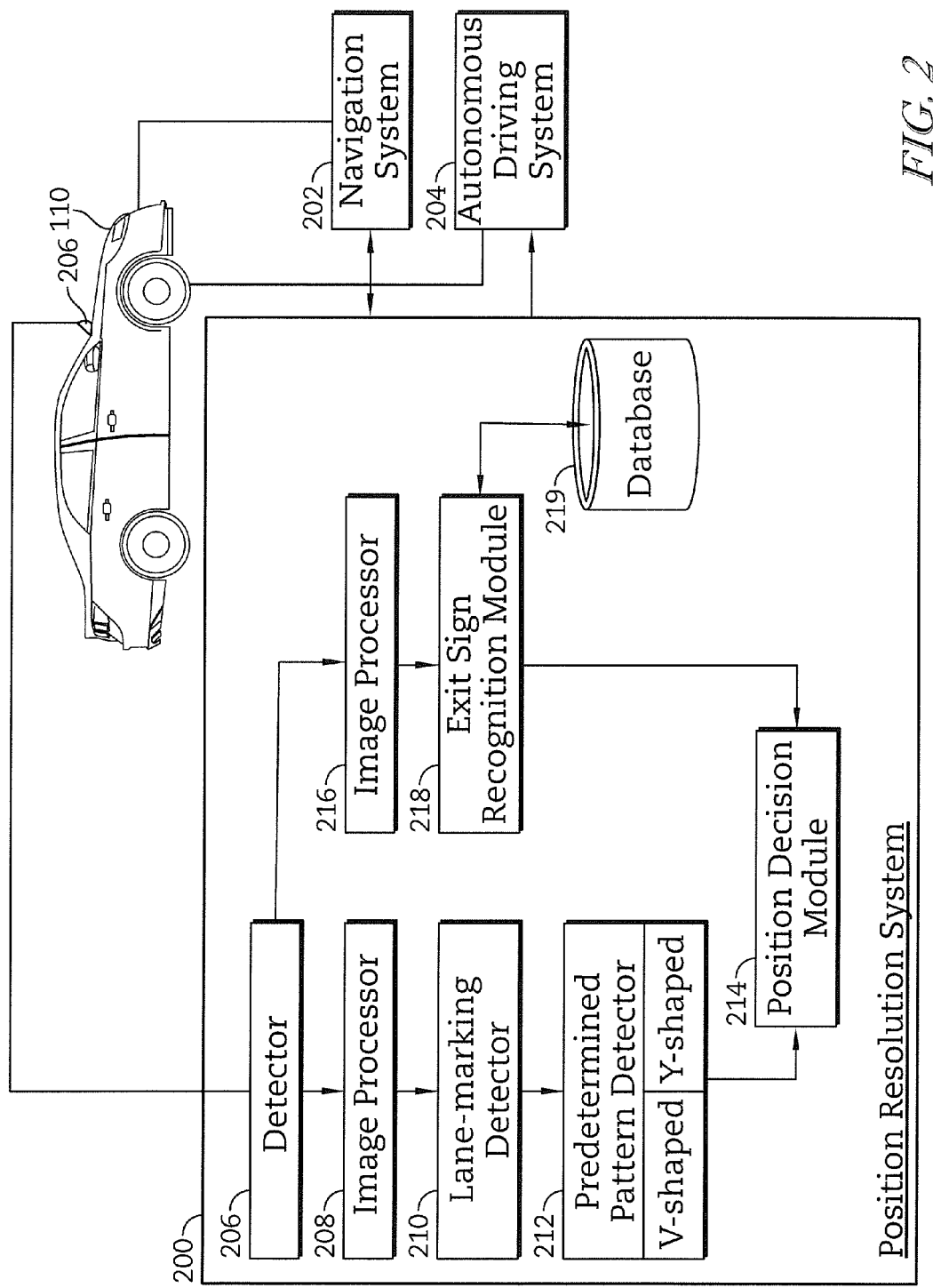
FIG. 2 is a diagrammatic view of a position resolution system in accordance with the present disclosures that includes a detector, one or more image processors, a lane-marking detector, a pre-determined pattern detector, an exit sign recognition module, and a position decision module, and shows that the position resolution system communicates with a navigation system and an autonomous driving system.

FIG. 2 shows a position resolution system 200 in accordance with the present disclosure. FIG. 2 shows that the position resolution system 200 is provided on the vehicle 110, which also includes a navigation system 202 and an autonomous driving system 204. Although the navigation system 202 and the autonomous driving system 204 are shown as separate from the position resolution system 200, in other embodiments either or both of the navigation system 202 and the autonomous driving system 204 may be provided as part of the position resolution system 200.

The position resolution system 200 includes a detector 206, several modules used to resolve the position of the vehicle 110 based on lane markings, and several modules used to resolve the position of the vehicle 110 based on exit signs. With respect to lane markings, the position resolution system 200 includes a first image processor 208, a lane-marking detector 210, a pre-determined pattern detector 212, and a position decision module 214. With respect to exit signs, the position resolution system 200 also includes a second image processor 216 and an exit sign recognition module 218.

The detector 206 may include one or more cameras capable of capturing image data within a field of view surrounding the vehicle 110. Exemplary image data within respective fields of view in accordance with the present disclosure are depicted in FIGS. 3A-5, to be described in more detail below. Generally, the field of view of the detector 206 may be sufficient to capture lane markings and exit signs appearing on the roadway 101 in front of and peripheral to the vehicle 110. For example, the detector 206 may have a horizontal angular field of view of 130 degrees, 140 degrees, or other suitable quantities.

Data from the detector 206 is transmitted to the first image processor 208. The first image processor 208 may perform image pre-processing to facilitate lane marking detection. For example, the first image processor 208 may extract frames of image data from the detector 206, and apply image processing filters to adjust and enhance image properties (e.g., brightness, contrast, edge enhancement, noise suppression, etc.). The first image processor 208 then transmits pre-processed frames of image data to the lane-marking detector 210.

The lane-marking detector 210 may detect and identify candidate lane markings from within the pre-processed frames of image data. Generally, lane markings on roadways are often painted white, such that the pixel intensity for portions of the image data corresponding to lane markings may sharply differ from the pixel intensity of other portions of the image data. Such differences give rise to discontinuities, near-discontinuities, or sharp gradients in pixel intensity at locations in the image data corresponding to lane markings. This allows the lane-marking detector 210 to identify candidate lane markings through a variety of techniques, including edge-detection techniques, ridge-detection techniques, or other feature extraction and identification methodologies.

Upon detection of candidate lane markings, the first image processor 208 can perform additional steps to determine whether the candidate lane markings are actual lane markings rather than false positives. For example, the first image processor 208 can compute slopes of candidate lane markings to determine whether the slopes are consistent with what would be expected of actual lane markings, and can compare image data among several consecutive frames to determine whether the relative position of candidate lane markings among those frames is consistent with what would be expected of actual lane markings.

Finally, the first image processor 208 may also perform perspective transformations, such that the first image processor 208 can analyze the identified lane markings from a top-down, plan perspective, rather than from a front perspective.

Figure 3A:
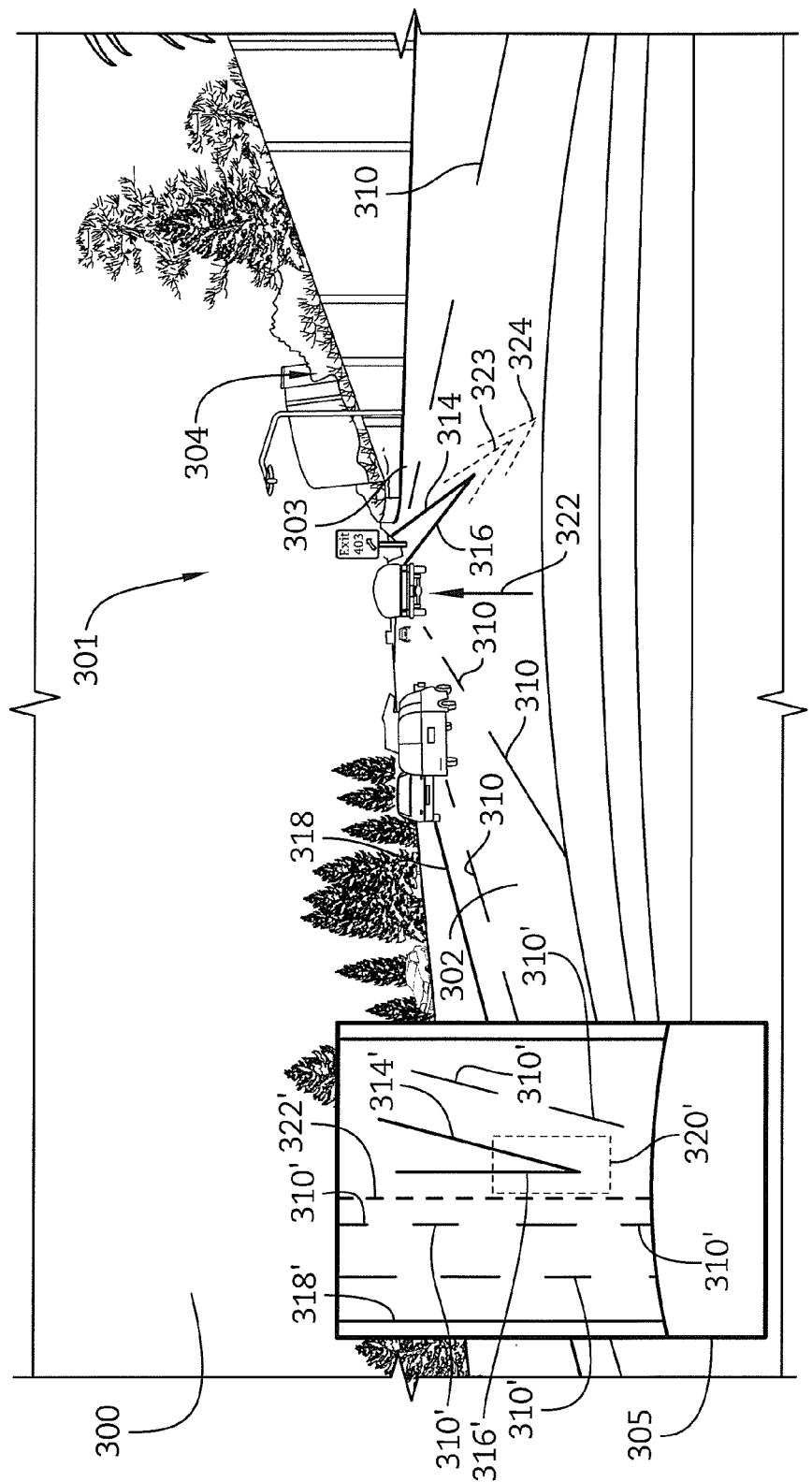
FIG. 3A shows exemplary image data captured by a position resolution system in accordance with the present disclosure, and suggests that the position resolution system has detected a predetermined pattern in the form of a V-shaped lane marking to the right of the vehicle.

FIG. 3A, to be discussed in more detail below, illustrates the result of the processing described above. In particular, FIG. 3A shows a frame of image data 300 captured by the detector 206 and retrieved by the image processor 208. FIG. 3A also shows an exemplary output 305 of the lane-marking detector 210. As shown, the frame of image data 300 captured various lane markings 310, 314, 316, 318. The output 305 from the lane-marking detector 210 shows detected lane markings 310', 314', 316', and 318'. The output 305 also shows that the lane-marking detector 210 performed a perspective transform—whereas the frame of image data 300 captures image data from a front perspective, the output 305 shows detected lane markings from a top-down, plan perspective.

Returning to FIG. 2, the detected lane markings are transmitted to the predetermined pattern detector 212. The predetermined pattern detector 212 analyzes the detected lane markings 310', 314', 316', and 318' to detect predetermined patterns among the lane markings that are characteristic of exit lanes. As explained in connection with FIG. 1, exemplary predetermined patterns that are characteristic of exit lanes include V-shaped lane markings (e.g., lane markings consisting of a first solid lined lane marking and a second, divergent solid lined lane marking), and Y-shaped lane markings (e.g., a single solid lined lane marking that branches into two divergent solid lines). Thus, in this illustrative embodiment, the predetermined pattern detector 212 is configured to detect V-shaped and Y-shaped lane markings. It should be understood that the terms "V-shaped" and "Y-shaped" are intended to describe a characteristic of such lane markings, and that lane markings that are not strictly shaped like the letters V or Y are within the scope of the present disclosure. For example, the position resolution system 200 can account for typical variations and curvatures among lane markings that are generally V-shaped or Y-shaped.

The predetermined pattern detector 212 can use a variety of methodologies to detect V-shaped and Y-shaped lane markings. For example, the predetermined pattern detector 212 may be configured to iterate through the detected lane markings 310', 314', 316', 318' to distinguish dashed line lane markings 310' from solid lined lane markings 314', 316', 318'. Dashed lane markings typically signify ordinary lane divisions, rather than diverging exit lanes, and so can be filtered away from consideration. The predetermined pattern detector 212 can then iterate through the detected solid line lane markings 314', 316', 318' to determine whether any pairs of solid line markings 314', 316', 318' form a V-shape.

Such a determination can be made by determining whether any pairs of solid line markings 314', 316', 318' have a point of intersection, by computing slopes of solid line markings 314', 316', 318' to determine whether their slopes are consistent with a V-shape, etc.

In this illustration, the detected solid line lane marking 318' is not paired with another intersecting solid line lane marking, and so is filtered away from consideration. However, the detected solid line lane markings 314' and 316' include a point of intersection and have relative slopes consistent with a V-shaped lane marking. As such, the predetermined pattern detector 212 may identify the lane markings 314' and 316' as comprising V-shaped lane marking 320.

Figure 5:
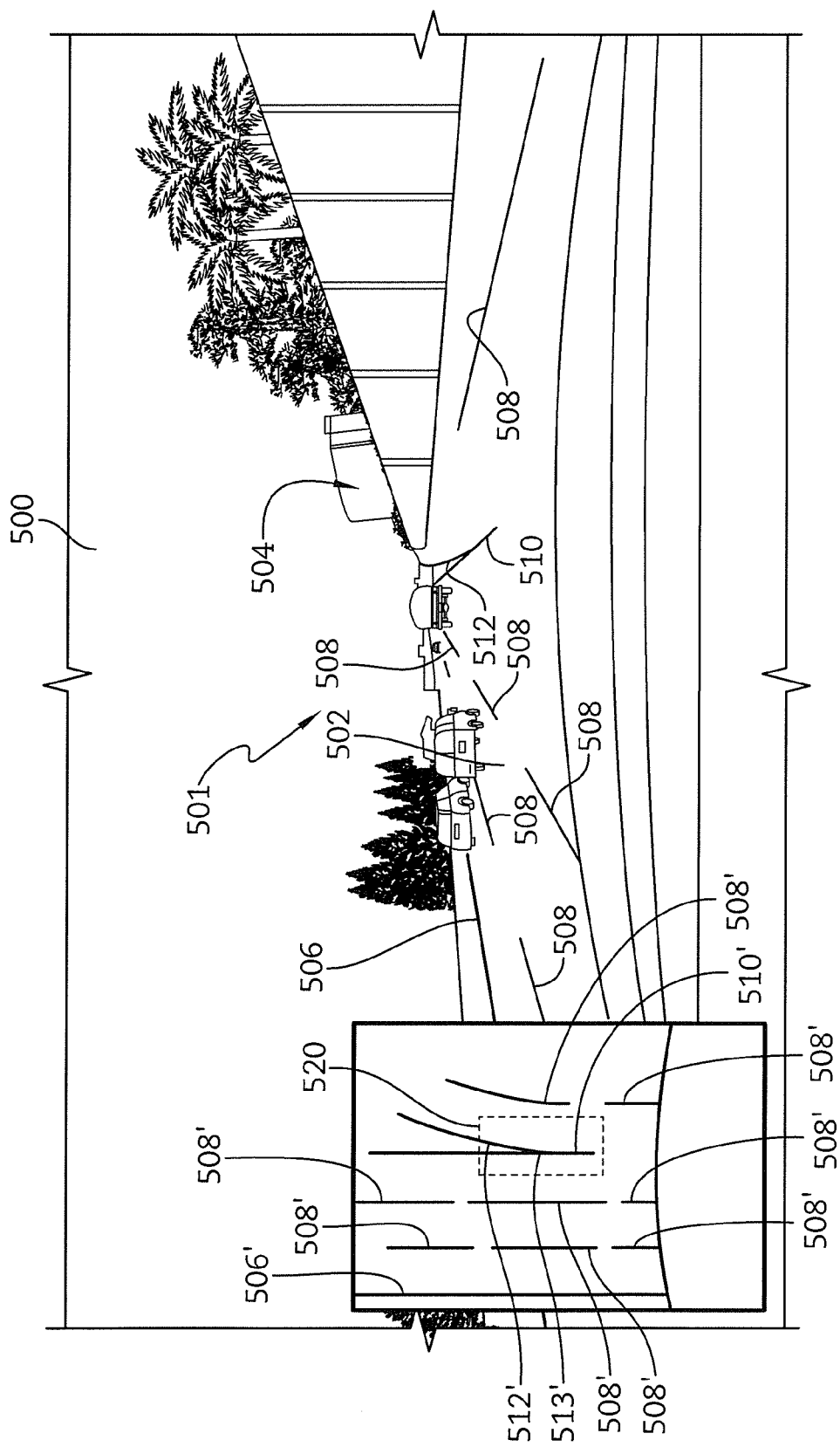
FIG. 5 shows exemplary image data captured by a position resolution system in accordance with the present disclosure, and suggests that the position resolution system has detected a predetermined pattern in the form of a Y-shaped lane marking to the right of the vehicle.

A similar approach can be used to detect Y-shaped lane markings. FIG. 5, for example, shows lane markings 506, 508, 510, 512, from which the lane-marking detector 210 has detected lane markings 506', 508', 510', and 512'. The predetermined pattern detector 212 may filter away the detected lane markings 508' as dashed lined markings, and may filter away the detected lane marking 506' as an unpaired solid line. The predetermined pattern detector 212 may identify the detected lane markings 510' and 512' as having a point of intersection 513', with the point of intersection 513' disposed at an interior location along the detected lane marking 510'. The predetermined pattern detector 212 may also assess the relative slopes of the detected lane markings 510' and 512'. Based on an analysis of the point of intersection 513' and the relative slopes, the predetermined pattern detector 212 may conclude that the detected lane markings 510' and 512' comprise a Y-shaped lane marking 520.

Returning to FIG. 2, after identifying a predetermined pattern of lane markings (e.g., V-shaped lane marking 320 or Y-shaped lane marking 520), the predetermined pattern detector 212 determines whether the predetermined pattern of lane markings is on the left side or the right side of the vehicle 110. Such a determination may be made, for example, by forming an axis aligned with the directional orientation of the vehicle 110. For example, FIG. 3A shows an axis 322' that aligns with the directional heading 322 of the vehicle 110. In the example of FIG. 3A, the V-shaped lane marking 320 is to the right of the axis 322', leading to a determination that the V-shaped lane marking 320 is to the right of the vehicle 110. FIG. 4A, in contrast, shows an exemplary V-shaped lane marking 420, and an axis 422' aligned with the directional heading 422 of the vehicle 110. Here, the V-shaped lane marking 420 is to the left of the axis 422'. As such, the predetermined pattern detector 212 may determine that the V-shaped lane marking 420 is to the left of the vehicle 110.

Alternatively, the predetermined pattern detector 212 may determine whether the predetermined pattern of lane markings is to the left or to the right of the vehicle based on trajectory analysis. As the vehicle progresses, the predetermined pattern of lane markings will appear in differing locations in subsequent frames of captured image data. For example, the predetermined pattern of lane markings may appear at a location 323 in a first subsequent frame, and a location 324 in a second subsequent frame. By recognizing the exit sign in each frame and comparing these locations, the exit sign recognition module 218 may conclude that the exit sign 352 is to the right of the vehicle—e.g., because its location within captured image data is trending down and towards the right over the course of subsequent frames.

The predetermined pattern detector 212 transmits its detections of V- or Y-shaped lane markings to the position decision module 214. The position decision module 214 forms a decision on whether the vehicle 110 is on the main portion 102 of the roadway 101 or is on the exit lane 103. To do so, the position decision module 214 may factor information received from the navigation system 202 regarding which side of the roadway 101 the exit 104 will appear. Using FIG. 1A as an example, the navigation system 202 may communicate to the position decision module 214 that the exit 104 is on the right side of the roadway 101. Based on this information, the position decision module 214 decides that the vehicle 110 is on the main portion 102 of the roadway 101, rather than on the exit lane 103.

The decision of the position decision module 214 may vary depending on which side of the vehicle 110 any V- or Y-shaped lane markings appear and which side of the roadway 101 the exit 104 appears. The following table summarizes the logic that may be implemented by the position decision module 214.

TABLE 1

|  | Exit on left side of roadway | Exit on right side of roadway |
| --- | --- | --- |
| V- or Y-shaped lane marking on left side of vehicle | Decision: Main portion of roadway | Decision: Exit lane |
| V- or Y-shaped lane marking on right side of vehicle | Decision: Exit lane | Decision: Main portion of roadway |

Information on which side of the roadway an exit appears need not come form the navigation system 202. For example, the position resolution system 200 may recognize the exit sign 132 and determine that an arrow 133 on the exit sign 132 is pointing towards the right, and thereby conclude that the exit 104 is on the right side of the roadway 101. The position resolution system 200 may also be configured to detect and recognize other exit signs, such as overhead exit signs, that appear certain distances in advance of an exit (e.g., signs indicating that a given exit is 1 mile away, ½ mile away, ¼ mile away, etc.) and recognize features on those signs to determine a side of the roadway of the exit.

After deciding whether the vehicle 110 is on the main portion 102 of the roadway 101 or on the exit lane 103, the position decision module 214 may communicate its decision to the navigation system 202. As explained, the native technology of the navigation system 202 may be unable to resolve whether the vehicle 110 has merged onto the exit lane 103 with the accuracy and timeliness of the position resolution system 200. The navigation system 202 may then update vehicle route guidance for the driver of the vehicle 110.

As previously explained, the position decision module 214 may also use exit sign detection as an alternative or additional methodology for determining whether the vehicle 110 has merged onto the exit lane 103. Exit sign detection may be suitable for use as confirmation because predetermined patterns of lane markings may appear, and therefore be detected, earlier than exit signs. For example, in the example of FIG. 1A, the V-shaped lane marking 130 may be detected prior to the exit sign 132.

The position resolution system 200 may include a second image processor 216 for exit sign recognition, but it should be understood that image processing functionality of the position resolution system 200 may be provided on one or more image processors. The second image processor 216 may perform pre-processing to facilitate exit sign recognition, such as to extract frames of image data from the detector 206, and apply filters to adjust and enhance image properties (e.g., brightness, contrast, color, edge enhancement, noise suppression, etc.).

Figure 3B:
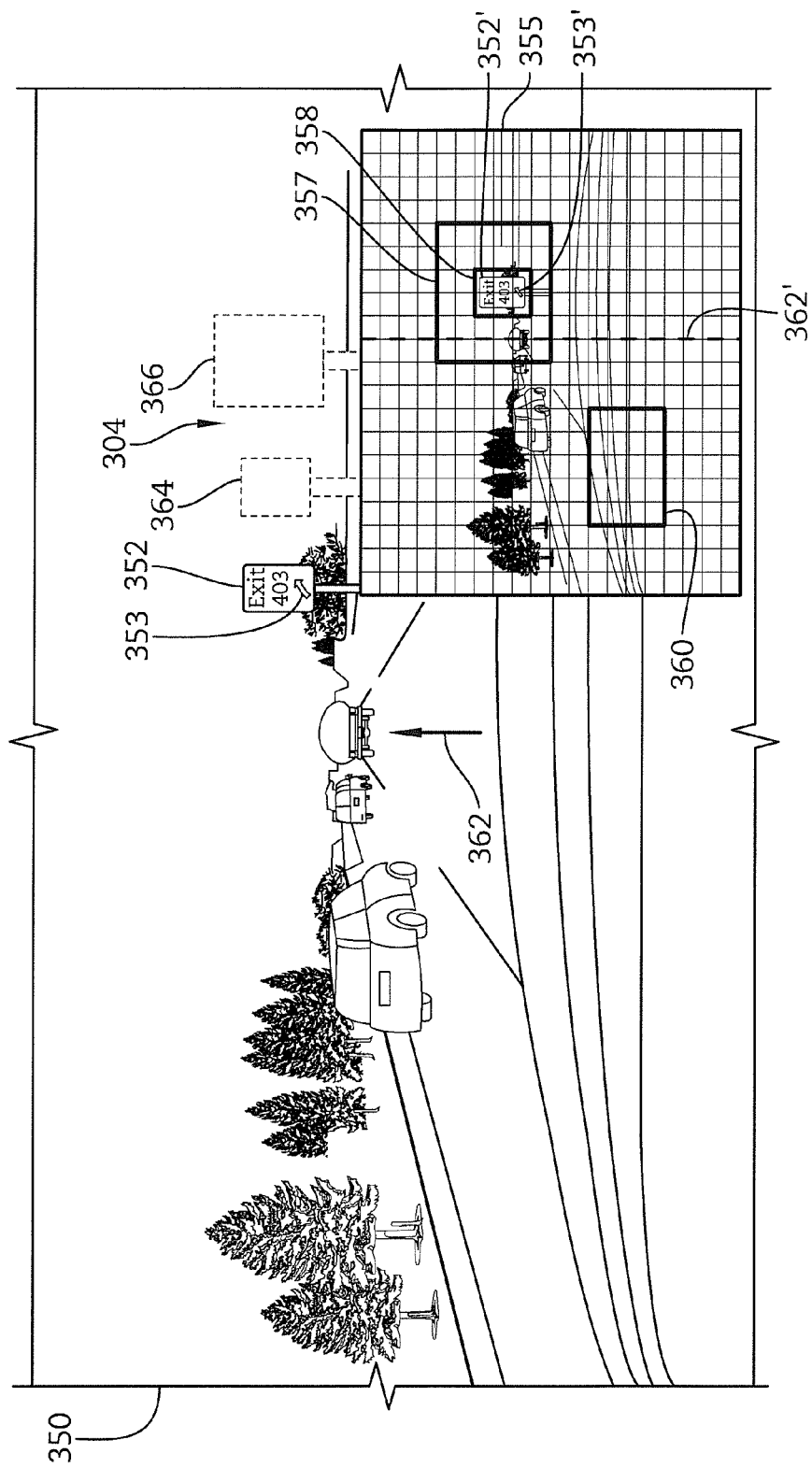
FIG. 3B shows exemplary image data captured by a position resolution system in accordance with the present disclosure, and suggests that the position resolution system has detected an exit sign to the right of the vehicle.

The exit sign recognition module 218 may recognize exit signs within the pre-processed frames of image data using any suitable object detection, recognition, and classification methodology. For example, FIG. 3B shows a frame of image data 350 that includes an exit sign 352, along with an exemplary pre-processed output 355 of the image processor 216. The exit sign recognition module 218 may perform pixel-based segmentation of the output 355 into subwindows, and perform object detection and recognition using subwindowing schemes, such as sliding window detection. By way of example, the exit sign recognition module 218 may iterate through a variety of subwindows of varying sizes and dimensions. For each subwindow, the exit sign recognition module 218 may perform a classification to determine whether that subwindow contains an exit sign. The classification can be based on statistical object detection and recognition methodology. Training data for the classification, including exemplary image data both containing exit signs and not containing exit signs, may be provided as part of a training database 219. For each subwindow at hand, the exit sign recognition module 218 can perform a classification to form a conclusion regarding whether that subwindow has an exit sign.

FIG. 3B shows, by way of example, an exemplary subwindow 360 that does not contain an exit sign, and was classified by the exit sign recognition module 218 as not containing an exit sign. The subwindow 358, however, was classified as containing a detected exit sign 352'. In certain implementations, the exit sign recognition module 218 may identify a subwindow, such as subwindow 357, as containing a detected exit sign 352' and perform additional processing to identify a smaller subwindow 358 containing the exit sign, as to more accurately identify its location.

Using similar object detection, recognition, and classification techniques, the exit sign recognition module 218 may also identify arrows on exit signs, such as the arrow 353. Classification techniques can be used to determine whether any identified arrows are pointing towards the right or the left. In this example, a detected arrow 353' may be recognized as pointing towards the right.

After detecting an exit sign, the exit sign recognition module 218 may determine whether the detected exit sign is to the left or to the right of the vehicle. Referring again to the example of FIG. 3B, the exit sign recognition module 218 may place an axis 362' on the output 355 corresponding to a directional heading 362 of the vehicle, determine that the detected exit sign 352' is to the right of the axis 362', and thereby determine that the detected exit sign 352' is to the right of the vehicle.

Alternatively, the exit sign recognition module 218 may determine whether the detected exit sign is to the left or to the right of the vehicle based on trajectory analysis of the detect exit sign among a sequence of frames of image data. As the vehicle progresses, the exit sign 352 will appear in differing locations in subsequent frames of captured image data. For example, the exit sign 352 may appear in a location 364 in a first subsequent frame, and a location 366 in a second subsequent frame. By recognizing the exit sign in each frame and comparing these locations, the exit sign recognition module 218 may conclude that the exit sign 352 is to the right of the vehicle—e.g., because its location within captured image data is trending towards the right over the course of subsequent frames.

The exit sign recognition module 218 may transmit its detection of exit signs to the position decision module 214. The position decision module 214 may form a decision on whether the vehicle 110 is on the main portion 102 of the roadway 101 or is on the exit lane 103. Using FIG. 1A as an example, the position decision module 214 may obtain information regarding which side of the roadway 101 the exit 104 is on. Such information may come from the navigation system 202, or from the exit sign recognition module 218 based on detection and classification of the directional arrow 133. Based on this information, along with the position decision module 214 indicating that the exit sign 132 is on the right side of the vehicle 110, the position decision module 214 may decide that the vehicle 110 is on the main portion 102 of the roadway 101, rather than on the exit lane 103.

The decision of the position decision module 214 may vary depending on which side of the vehicle 110 exit signs are detected and which side of the roadway 101 the exit 104 appears, similar to the case with detection of predetermined patterns of lane markings, as discussed above.

In illustrative embodiments, the position decision module 214 may use exit sign recognition to confirm the accuracy of a prior decision formed based on detection of predetermined patterns of lane markings. For example, if the position decision module 214 arrived at the same decision based on both detection of predetermined patterns of lane markings and exit sign recognition, the position decision module 214 will have confirmed its initial decision. If it arrives at different decisions, the position decision module 214 may conclude that its initial decision may have been in error, or that it is unable to reach a decision with sufficient certainty.

FIGS. 3A-5 show illustrative uses of the position resolution system 200. FIG. 3A shows a frame of image data 300 captured by the detector 206 at a location on a roadway 301 having a main portion 302 and an exit lane 303 associated with an exit 304. Here, the position resolution system 200 has detected a predetermined pattern of lane markings 320 in the form of V-shaped lane markings to the right, and also factors that the exit 304 is to the right of the roadway 301. As a result, the position resolution system 200 determines that the vehicle is on the main portion 302 of the roadway 301.

FIG. 3B shows a frame of image data 350 captured by the detector on the roadway 301 at a later point in time, when the vehicle has approached closer to the exit 304. The position resolution system 200 detects the exit sign 353 to the right of the vehicle, which provides confirmation that the vehicle has stayed on the main portion 302 of the roadway 301.

FIG. 4A, in contrast, shows a frame of image data 401 in which a predetermined pattern of lane markings 420, in the form of V-shaped lane markings, appear to the left of the vehicle. The position resolution system 200 determines that the vehicle has merged onto the exit lane 403.

FIG. 4B shows a frame of image data 450 captured at a later point in time, after the vehicle has progressed further down the exit lane 403. The position resolution system 200 recognizes an exit sign 453 to the left, which provides confirmation that the vehicle has exited onto the exit lane 403.

FIG. 5 shows a frame of image data 500 and illustrates the use of Y-shaped lane markings. Here, the position resolution system 200 has detected a predetermined pattern of lane markings 520 in the form Y-shaped lane markings to the right of the vehicle. Because the exit 504 is to the right of the roadway 501, the position resolution system 200 determines that the vehicle has stayed on a main portion 502 of the roadway 501.

Figure 6:
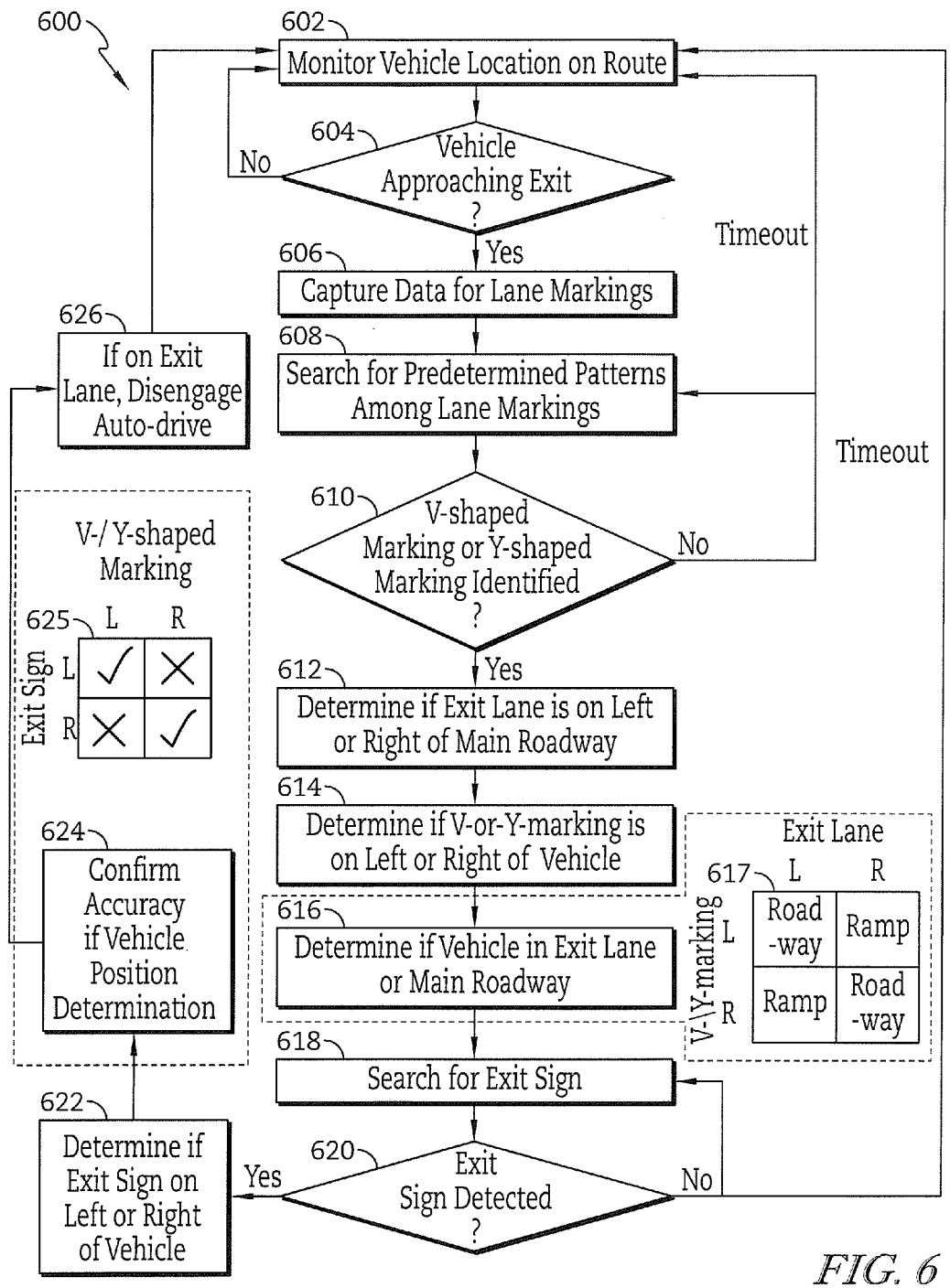
FIG. 6 is a flow diagram illustrating a methodology for operation of a position resolution system in accordance with the present disclosures.

FIG. 6 is a flow diagram 600 illustrating a methodology for operation of a position resolution system in accordance with the present disclosures. The illustrative methodology begins with operation 602, in which a navigation system monitors the location of a vehicle on its route. In operation 604, the navigation system determines whether the vehicle is approaching an exit. If not, the navigation system returns to operation 602 and continues monitoring. If the vehicle is approaching an exit, the navigation system notifies the position resolution system, which proceeds to operation 606.

In operation 606, the position resolution system captures data for lane markings. In operation 608, the position resolution system searches for predetermined patterns among lane markings. As explained, predetermined patterns may include V-shaped lane markings or Y-shaped lane markings. Thus, in operation 610, the position resolution system determines whether any V-shaped lane markings or Y-shaped lane markings have been identified. If not, the position resolution system continues to search for predetermined patterns among the lane markings.

After a period of time elapses in which the position resolution system did not identify any predetermined patterns, the position resolution system may timeout and return to operation 602. Similarly, if the navigation system indicates that the vehicle has already passed the exit, the position resolution system may return to operation 602. In such a situation, it may be that the position resolution system missed the predetermined patterns representing the exit lane—e.g., because the predetermined patterns were obscured by other vehicles, not painted properly on the roadway, etc.

If the position resolution system does identify predetermined patterns among the lane markings, the position resolution system determines that it has identified an exit lane and proceeds to operation 612. In operation 612, the position resolution system determines if the exit lane is on the left or right of the main portion of the roadway. This information can be obtained from the vehicle navigation system, from image recognition of exit signs having arrows, etc. In operation 614, the position resolution system determines if the identified predetermined patterns of lane markings are on the left side or right side of the vehicle.

In operation 616, the position resolution system decides if the vehicle has stayed on the main portion of the roadway or exited onto an exit lane. The logic by which this decision can be made has been summarized above, and is depicted by way of table 617.

As explained, the position resolution system may in the alternative, or in addition, use exit signs instead of, or in addition to, lane markings. In this illustrative methodology, the position resolution system uses exit signs in addition to lane markings for verification purposes. Thus, the position resolution system proceeds to operation 618, in which it searches for exit signs.

In operation 620, the position resolution system determines whether an exit sign has been recognized. If not, the position resolution system returns to operation 618 to continue searching for exit signs. After a period of time in which no exit sign has been recognized, the position resolution system may timeout and return to operation 602. Similarly, if the navigation system indicates that the vehicle has already passed the exit, the position resolution system may return to operation 602. In such a situation, it may be that the position resolution system missed the exit sign (e.g., because it was obscured or outside its field of view), or that there was no exit sign.

If the position resolution system recognizes an exit sign, the position resolution system proceeds to operation 622, in which it determines if the exit sign is on the left or right side of the vehicle. The position resolution system then proceeds to operation 624, in which it confirms the accuracy of the vehicle position determination that had resulted from operation 616. The logic by which the verification can be conducted was explained above and is summarized by way of the table 625.

If the position resolution system confirms that the decision generated by operation 616, it may transmit that decision to the vehicle navigation system. Moreover, if the confirmation indicates that the vehicle is in an exit lane, the position resolution system may, in accordance with operation 626, disengage the vehicle autonomous driving system.

If, however, the position resolution system deter mines that the decision generated by operation 616 was incorrect, the position resolution system may take no further action. In such a situation, the vehicle navigation system may continue using its native technology to determine the position of the vehicle, without further input from the position resolution system.

Although the discussion above provided Y-shaped and V-shaped lane markings as examples of predetermined patterns characteristic of exit lanes, other predetermined patterns can be used depending on the manner of lane marking used for a given highway topology.

In addition, the discussion above provided exit sign examples that appear on sign posts in islands that separate main portions of roadways from exit lanes. However, other types of exit sign recognition is also within the scope of the present disclosure. For example, the position resolution system 200 may identify, detect, and recognize overhead exit signs.

As discussed above, the position resolution system 200 may provide accurate and timely detection of exit lanes diverging from a main portion of a roadway. A similar approach may be used to provide accurate and timely detection of on-ramp lanes merging with main portions of roadways. Whereas predetermined patterns of lane markings for exit lanes may include V-shaped or Y-shaped lane markings, predetermined patterns for on-ramps may include inverse V-shaped or inverse Y-shaped lane markings.

The above-described components, including the first image processor 208, the second image processor 216, the lane-marking detector 210, the predetermined pattern detector 210, the exit sign recognition module 218, and the position decision module 214, may be implemented in software, compiled and stored to a memory as object code, and during operation of the vehicle, may be invoked for execution by a processor. In one implementation, the above-described components are implemented as a single system on a chip. The interconnections among the above-described components can be provided through any suitable electronic communication mechanism, such as a communication bus. Alternatively, the position resolution system 200 may be provided on a common hardware platform as the navigation system 202 and/or the autonomous driving system 204. Thus, the position resolution system 200, the navigation system 202, and the autonomous driving system 204 may be implemented as software complied into object code on one or more memories that, during runtime, are invoked for execution by a processor, such that all systems are provided in a common chip package. Where the position resolution system 200, the navigation system 202, and the autonomous driving system 204 are provided in separate hardware modules, they may communicate with one another through any suitable electronic communication mechanism, such as a communication bus.

Whether implemented as one chip module or multiple chip modules, the position resolution system 200, the navigation system 202, and the autonomous driving system 204 may be provided in any convenient location in the autonomous vehicle 102, such as behind a dashboard near other electronic circuitry. Such a location may be beneficial for providing convenient access to a power source, and to the electronic systems controlling the vehicle's driving.

The database 219 may be implemented using any known database environment, such as Oracle, DB2, or SQL Server.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

The invention claimed is:

1. An in-vehicle system for determining whether a vehicle in an autonomous driving mode has moved off of a main roadway and into an exit lane, the system comprising:
   an a navigation unit for determining that an exit is approaching on a side of the main roadway;
   a camera for obtaining image data regarding lane markings and exit signs in response to a determination by the navigation unit that the exit is approaching;
   an image processor for identifying a predetermined pattern among the lane markings and for determining a side of the vehicle on which the predetermined pattern exists, wherein the predetermined patterns include a Y-shaped configuration of solid line lane markings and a V-shaped configuration of solid line lane markings;
   means for determining whether the vehicle has moved into the exit lane based on an assessment of the side of the main roadway on which the exit is approaching and the side of the vehicle on which the predetermined pattern exists; and
   means for verifying the determination by recognizing an exit sign and determining a side of the vehicle on which the exit sign exists,
   wherein the in-vehicle system issues a warning to a driver of the vehicle and disengages the autonomous driving mode in response to a verified determination that the vehicle has moved into the exit lane.

2. The in-vehicle system of claim 1, wherein the navigation unit determines a new route to a previously selected destination in response to a determination that the vehicle has moved into the exit lane.

3. An in-vehicle system for determining whether a vehicle in an autonomous driving mode has moved off of a main roadway and into an exit lane, the system comprising:
   a communication link on which an indication that the vehicle is approaching an exit is received;
   a detector that captures data regarding lane markings on the roadway; and
   a processor and a non-transitory data storage on which is stored computer code which, when executed on the processor, causes the in-vehicle system to:
      identify predetermined patterns among the lane markings on the roadway;

determine whether the vehicle has moved into the exit lane based on an identification of one of the predetermined patterns, and verify the determination by recognizing an indication that the vehicle is approaching an exit, wherein the in-vehicle system issues a warning to a driver of the vehicle and disengages the autonomous driving mode in response to a verified determination that the vehicle has moved into the exit lane.

4. The in-vehicle system of claim 3, wherein the detector is configured to capture data regarding exit signs, and the computer code, when executed on the processor, causes the in-vehicle system to verify a determination that the vehicle has moved into the exit lane based on an identification of an exit sign.

5. The in-vehicle system of claim 3, wherein the computer code, when executed on the processor, causes the in-vehicle system to recognize the indication that the vehicle is approaching an exit by:

determining that the vehicle is approaching an exit on a right side of the main roadway; and determining that the vehicle has moved into the exit lane in response to an identification of one of the predetermined patterns on a left side of the vehicle.

6. The in-vehicle system of claim 3, wherein the communication link is communicatively coupled to an in-vehicle navigation system.

7. The method of claim 6, wherein the in-vehicle navigation system is configured to reroute directional guidance to a driver of the vehicle in response to a determination that the vehicle has moved into the exit lane.

8. The in-vehicle system of claim 3, wherein the computer code, when executed on the processor, causes the in-vehicle system to identify occurrences of a first predetermined pattern consisting of a single solid line that branches into two divergent solid lines, and a second predetermined pattern consisting of two divergent solid lines.

9. The in-vehicle system of claim 8, wherein the first predetermined pattern is Y-shaped, and the second predetermined pattern is V-shaped.

10. A method for determining whether a vehicle in an autonomous driving mode has moved off of a main roadway and into an exit lane, the method comprising:

determining that the vehicle is approaching an exit;

capturing data regarding lane markings on the roadway;

identifying predetermined patterns among the lane markings on the roadway;

determining whether the vehicle has moved into the exit lane based on an identification of one of the predetermined patterns; and verifying the determination by recognizing an indication that the vehicle is approaching an exit, wherein the vehicle issues a warning to a driver of the vehicle and disengaging the autonomous driving mode in response to a determination that the vehicle has moved into the exit lane.

11. The method of claim 10, further comprising:

determining that the vehicle is approaching an exit on a right side of the main roadway; and determining that the vehicle has moved into the exit lane in response to an identification of one of the predetermined patterns on a left side of the vehicle.

12. The method of claim 11, wherein the recognition of the indication that the vehicle is approaching an exit is based on:

identifying an exit sign; and verifying a determination that the vehicle has moved into the exit lane in response to an identification of the exit sign.

13. The method of claim 12, comprising capturing the data regarding lane markings on the roadway after receiving an indication from a navigation unit that the vehicle is a predetermined distance away from an exit.

14. The method of claim 10, further comprising:

identifying a directional arrow on an exit sign; and determining a side of the vehicle on which the exit lane is departing based on a direction in which the directional arrow is pointing.

15. The method of claim 10, wherein the predetermined patterns include a first predetermined pattern consisting of a single solid line that branches into two divergent solid lines, and a second predetermined pattern consisting of two divergent solid lines.

16. The method of claim 15, wherein the first predetermined pattern is Y-shaped, and the second predetermined pattern is V-shaped.

17. The method of claim 10, further comprising rerouting directional guidance to a driver of the vehicle in response to a determination that the vehicle has moved into the exit lane.

18. An in-vehicle system for determining whether a vehicle in an autonomous driving mode has moved off of a main roadway and into an exit lane, the system comprising:

a navigation unit for determining that an exit is approaching on a side of the main roadway;

a camera for obtaining image data regarding lane markings and exit signs in response to a determination by the navigation unit that the exit is approaching;

an image processor for identifying a predetermined pattern among the lane markings and for determining a side of the vehicle on which the predetermined pattern exists, wherein the predetermined patterns include a Y-shaped configuration of solid line lane markings and a V-shaped configuration of solid line lane markings; and an autonomous driving system that determines whether the vehicle has moved into the exit lane based on an assessment of the side of the main roadway on which the exit is approaching and the side of the vehicle on which the predetermined pattern exists, wherein the autonomous driving system verifies the determination by recognizing an exit sign and determining a side of the vehicle on which the exit sign exists, and wherein the in-vehicle system issues a warning to the driver and disengages the autonomous driving system in response to a determination that the vehicle has moved into the exit lane.

19. The in-vehicle system of claim 18, wherein the navigation unit determines a new route to a previously selected destination in response to a determination that the vehicle has moved into the exit lane.

* * * * *